United States Patent [19]

Arnold et al.

[11] 4,264,342

[45] Apr. 28, 1981

[54] THERMALLY CONDENSED MIXTURE OF POLYACRYLONITRILE AND FERROUS ACETATE AS CARBON MONOXIDE ADSORBENT

[75] Inventors: Mary T. Arnold, Upland; John J. Leonard, Springfield; John J. McCoy, Media, all of Pa.

[73] Assignee: Atlantic Richfield Company, Los Angeles, Calif.

[21] Appl. No.: 135,053

[22] Filed: Mar. 28, 1980

[51] Int. Cl.$^3$ .............................................. B01D 19/00
[52] U.S. Cl. .......................................... 55/68; 55/74; 252/431 C; 423/247
[58] Field of Search ...................... 55/68, 74; 423/246, 423/247, 418; 252/431 C

[56] References Cited

U.S. PATENT DOCUMENTS 3,982,897  9/1976  Scheinberg .............................. 55/68

Primary Examiner—Bernard Nozick
Attorney, Agent, or Firm—Delbert E. McCaslin

[57] ABSTRACT

Separating carbon monoxide from mixed gases containing the same with an adsorbent which is the product of heating a mixture of ferrous acetate and polyacrylonitrile in a ratio of ferrous acetate to polyacrylonitrile of 0.5:1.0 to 2.0:1.0 at a temperature of about 200°–400° C. in an oxygen-containing atmosphere for from about 2 to 10 hours.

7 Claims, No Drawings

THERMALLY CONDENSED MIXTURE OF POLYACRYLONITRILE AND FERROUS ACETATE AS CARBON MONOXIDE ADSORBENT

BACKGROUND OF THE INVENTION

Commercially, the recovery of carbon monoxide from waste gas stream is carried out by cryogenic methods or by means of the "Cosorb" process. The latter process uses cuprous aluminum chloride in toluene solvent to adsorb CO from gas mixtures at ambient temperatures and at pressures of less than 20 atmospheres. The principal disadvantage of this process is decomposition of the adsorbent by water vapor or by sulphur compounds which must therefore be reduced to levels on the order of 1 ppm. Other adsorbent solvent systems for the recovery of CO from gas mixtures are known in the patent literature such as liquid fluorocarbons (U.S. Pat. No. 3,762,133) and cuprous fluoroborate dissolved in toluene (U.S. Pat. No. 3,060,676). These processes are subject to similar problems. Additionally, solvent vapors carried over by the unabsorbed gases and by desorbed CO during thermal desorption must be recovered.

In view of the prior art difficulties mentioned above, it would be advantageous to have a solid adsorbent system for CO recovery. A number of such adsorbents are known for this purpose. For example, active carbon, molecular sieves or silica gel having been used to adsorb CO from gas mixtures using a pressure swing adsorption process when $H_2$ is the major contaminating gas. However, the process employing these adsorbents generally does not produce high purity CO and is useful only for $H_2$ containing CO streams in which the CO is present at low concentrations and only high purity $H_2$ is desired.

It is an object of the present invention to produce an adsorbent for CO which is not destroyed on contact with water, which is thermally stable to allow for thorough stripping of adsorbent gas and which will adsorb CO in nitrogen rich gas streams such as those produced by blast oven furnaces.

BRIEF DESCRIPTION OF THE INVENTION

The present invention comprises a process for separating carbon monoxide from mixed gases containing the same which comprises contacting the mixed gases with an adsorbent which is the product of heating a mixture of ferrous acetate and polyacrylonitrile in a ratio of ferrous acetate to polyacrylonitrile of 0.5:1.0 to 2.0:1.0 at a temperature of about 200°–400° C. in an oxygen-containing atmosphere for from about 2 to 10 hours. The adsorbed CO may be recovered from the adsorbent by thermally stripping at a temperature of from about 100° to 160° C.

DETAILED DESCRIPTION OF THE INVENTION

The adsorbent of the present invvention is prepared by heating a mixture of ferrous acetate and polyacrylonitrile in a ratio of ferrous acetate to polyacrylonitrile of 0.5:1.0 to 2.0:1.0 at a temperature of about 200°–400° C. in an oxygen-containing atmosphere for from about 2 to 10 hours. Preferably, said ratio is from 0.8:1.0 to 1.8:1.0. Moreover, the preferred temperature of heating ranges from about 220°–250° C. and the preferred time of heating ranges from 3 to 6 hours. Said mixture of ferrous acetate and polyacrylonitrile can be accomplished by intimately mixing the two solids. However, the iron salt may be deposited on the polyacrylonitrile by dispersing it in a large volume of a suitable liquid, such as methanol, which contains the iron salt. Upon completion of the adsorption of the metal salt, the polyacrylonitrile is separated from the solution by filtration or evaporation of the solvent.

The adsorbent described above will adsorb about 0.5 to 1.0 g CO per 100 g adsorbent at ambient temperature and atmospheric pressure. Said adsorbent is especially useful for adsorbing CO from nitrogen rich gas mixtures due to the low capacity of the adsorbent for $N_2$, e.g., 0.2 g $N_2$ per 100 adsorbent. Although adsorption of carbon monoxide is feasible at temperatures of from about 0° to 50° C. and at temperatures of from 1 to about 11 atmospheres, ambient and atmospheric pressure are preferred conditions for operation.

In order to recover adsorbed CO from the adsorbent, it is merely necessary to thermally strip the adsorbent at a temperature of from about 100° to 160° C. Thermal stripping data is presented in the Examples hereinafter.

The following Examples are for the purpose of illustrating the present invention but are not limiting to the scope thereof which is set forth in the claims.

EXAMPLE 1

Preparation of thermally condensed polyacrylonitrile iron complex with ferrous acetate. One g of acrylonitrile homopolymer in the powder form was intimately mixed with 1.0 g ferrous acetate. It was put into a test tube and heated to 240° C. over a period of 90 minutes and held at 240°–250° C. for 3 hours. Upon cooling, 1.24 g of black powder was recovered. Iron content of the final product was 22.9 wt.%.

EXAMPLE 2

A sample of 0.3180 g from Example 1 was placed in a galss tube and 99.99% CO was passed over it at a flow rate of 60 ml/min. At the end of 4 hours at 22° C., it had adsorbed 2.1 mg CO.

EXAMPLE 3

Carbon monoxide Uptake Isotherm Data Compound: Thermally condensed polyacrylonitrile-Fe complex prepared in Example 1. CO uptake at 20 ml/min at 20°–23° C. after 4 hours.

| Vol. % CO in He | gm CO/100 gm adsorbent |
|---|---|
| 2 | 0.098 |
| 10 | 0.387 |
| 25 | 0.48 |
| 50 | 0.46 |
| 100 | 0.66 |

EXAMPLE 4

Carbon monoxide Desorption Data from the above complex. Desorption conditions: 125° C. in 100% He flow.

| Time, min | % CO desorbed |
|---|---|
| 15 | 72 |
| 30 | 82 |
| 60 | 93 |
| 90 | 99 |

EXAMPLE 5

Hydrogen Adsorption. Compound: Iron complex prepared according to the conditions of Example 1. $H_2$ uptake at 22°–23° C. over a 4 hour period.

| Vol. % $H_2$ in He | $H_2$ flow, ml/min | gm $H_2$/100 g Adsorbent |
|---|---|---|
| 10 | 60 | 0.28 |
| 25 | 60 | 0.39 |
| 50 | 60 | 0.46 |
| 100 | 60 | 0.52 |
| 100 | 20 | 0.22 |

EXAMPLE 6

Nitrogen Adsorption. Compound: Iron complex prepared according to the conditions of Example 1. $N_2$ uptake at 21° C. over a 4 hour period.

| Vol. % $N_2$ | $N_2$ Flow, ml/min | gm $N_2$/100 g Adsorbent |
|---|---|---|
| 100 | 20 | 0.26 |

EXAMPLE 7-10

Compare the CO capacity of the iron complex, prepared according to the conditions in Example 1, at 40° C. relative to that at ambient temperature. Example 9 illustrates that total desorption is not necessary to reach full capacity. Example 10 illustrates that water does not destroy the capacity of the adsorbent for carbon monoxide.

| Example No. | Adsorbate | Vol. % | Flow ml/min | Temp. °C. | wt. % Gas Adsorbed |
|---|---|---|---|---|---|
| 7 | CO | 100 | 60 | 22 | 0.65 |
| Desorption Complete. | | | | | |
| 8 | CO | 100 | 60 | 40 | 0.48 |
| Desorption 28.7% CO removed. | | | | | |
| 9 | CO | 100 | 60 | 40 | 0.60 |
| Adsorbent wet with water. | | | | | |
| Adsorbent dried and desorbed of CO at 100° C., 100% He. | | | | | |
| 10 | CO | 100 | 60 | 40 | 0.56 |

We claim:

1. A process for separating carbon monoxide from mixed gases containing the same comprising contacting said mixed gases with an adsorbent, said adsorbent being the product of heating a mixture of ferrous acetate and polyacrylonitrile in a ratio of ferrous acetate to polyacrylonitrile of 0.5:1.0 to 2.0:1.0 at a temperature of about 200°–400° C. in an oxygen-containing atmosphere for from about 2 to 10 hours.

2. The process of claim 1 wherein said ratio is from 0.8:1.0 to 1.8:1.0.

3. The process of claim 1 wherein said temperature is from 220°–250° C.

4. The process of claim 1 wherein said time is from 3 to 6 hours.

5. The process of claim 1 wherein said mixture of gases is contacted with said adsorbent at ambient temperature and at atmospheric pressure.

6. The process of claim 1 wherein said adsorbed CO is recovered by thermally stripping said adsorbent at a temperature of from about 100° to 160° C.

7. The process of claim 1 wherein said mixture of gases is nitrogen-rich.

* * * * *